United States Patent [19]

Ailshie et al.

[11] 4,082,342
[45] Apr. 4, 1978

[54] LATCHING MECHANISM

[75] Inventors: Roger Howard Ailshie; Roy Reynolds, both of New Berlin, Wis.

[73] Assignee: Applied Power, Inc., Milwaukee, Wis.

[21] Appl. No.: 696,591

[22] Filed: Jun. 16, 1976

[51] Int. Cl.² .............................................. B60J 1/00
[52] U.S. Cl. .................................. 296/28 C; 292/144; 180/89.15
[58] Field of Search ........................... 296/28 C, 35 R; 180/89.15; 292/144, 252; 339/91 B

[56] References Cited

U.S. PATENT DOCUMENTS

| 3,667,566 | 6/1972 | Hopkins | 180/89.15 |
| 3,753,316 | 8/1973 | Savarieau | 292/144 |

Primary Examiner—Philip Goodman

Attorney, Agent, or Firm—John J. Bryne; Edward E. Dyson

[57] ABSTRACT

A latching mechanism for a cab which is tiltably mounted to the chassis of a vehicle. The cab is normally disposed over the engine of the vehicle in a first or lowered position and is pivotally attached to the chassis at its forward end for movement through 90° to a second or raised position. The latching mechanism securely locks the cab in the lowered position and includes interengaging latching elements attached to the underside of the cab and to the chassis of the vehicle. The receiving means includes a ball detent arrangement actuated by means of a hydraulically powered cam sleeve. The ball detents move radially between a first or unlocked position and a second and locked position. When in the locked position, the detents engage shoulder portions on one latching element to securely lock the cab to the chassis.

11 Claims, 4 Drawing Figures

LATCHING MECHANISM

BACKGROUND OF THE INVENTION

This invention relates to a latching mechanism which may be put to a number of different uses but which is disclosed herein as being primarily useful with vehicles wherein an operator cab is mounted over the engine and is tiltable from a first or lowered position through approximately 90° to a second or raised position to expose and permit access to the engine when required.

In one form of this invention the latching mechanism includes a latching element affixed to one side of a member to be locked into position and a latching member receiving means affixed to a surface of a member to which it is to be secured. The latching element receiving means includes a cam-actuated detent arrangement whereby the detents will move radially from a first or unlocked position to a second or locked position in engagement with detent receiving means on the latching element to firmly secure the latching element and the member to which it is attached. There are many latching mechanisms in the prior art which employ a cam-actuated detent arrangement. U.S. Pat. No. 3,764,172 to Standke dated Oct. 29, 1971, and entitled LATCH ASSEMBLY, discloses a detent type arrangement in a latching mechanism. Also, there is a fair amount of activity in the prior art in the area of latching mechanisms for tilting cab vehicles. See, for example, U.S. Pat. No. 3,667,566 to Hopkins, dated June 6, 1972, entitled RELEASABLE CONNECTOR PARTICULARLY FOR TILT CAB VEHICLES. The latching mechanism of this invention constitutes an improvement over mechanisms such as those disclosed in the aforementioned patents.

SUMMARY OF THE INVENTION

The latching mechanism of this invention is useful in any number of situations wherein it is desired to secure one member to another. The latching mechanism is particularly useful in tilting cab vehicles and will be described in the context of such use for purposes of description.

In a preferred embodiment, a latching element is secured to the upper surface of a chassis on each side thereof at the rear end portion. The latching element includes an upstanding elongated sheath receiving a piston. The upper end of the sheath defines an annular shoulder. A latching element-receiving member is firmly affixed to the underside of a tilting cab at points overlying the latching elements when the cab is in the fully lowered position. The receiving member comprises a cylindrical housing having a cap slidably mounted therein for vertical movement between first and second positions. A cylindrical keeper is mounted in the cap. A plurality of annularly disposed openings in the receiving member receive and retain spherical detent elements which are movable radially within the openings. The inner diameter of the cylindrical member is only slightly larger than the outer diameter of the sheath.

Additionally, a significant improvement provided by this invention is the provision of shock absorber means for absorbing impact created when the latching element is pushed into engagement with the receiving member. The shock absorber means includes an annular elastomeric member having a central opening with inwardly and downwardly tapered side walls. An annular bearing plate is affixed to the tapered walls to minimize wear and tear on the elastomeric member. However, the absorber eliminates the usual undesirable effects of metal-to-metal contact.

It is a primary objective of this invention to provide a mechanism which is relatively simple in structure and is relatively inexpensive to manufacture.

Another objective of the invention is to provide a mechanism of the nature wherein an absorber is provided to permit limited movement between the cab and the chassis when the vehicle is traversing unusually rough or lumpy terrain.

It is a further objective of this invention to provide a latching mechanism which provides for positive locking with a minimum of play between the elements which are locked together but, at the same time, permits a spring-controlled movement.

These and other objects of the invention will become more apparent to those skilled in the art by reference to the following detailed description when viewed in light of the accompanying drawings wherein.

Figure 1:
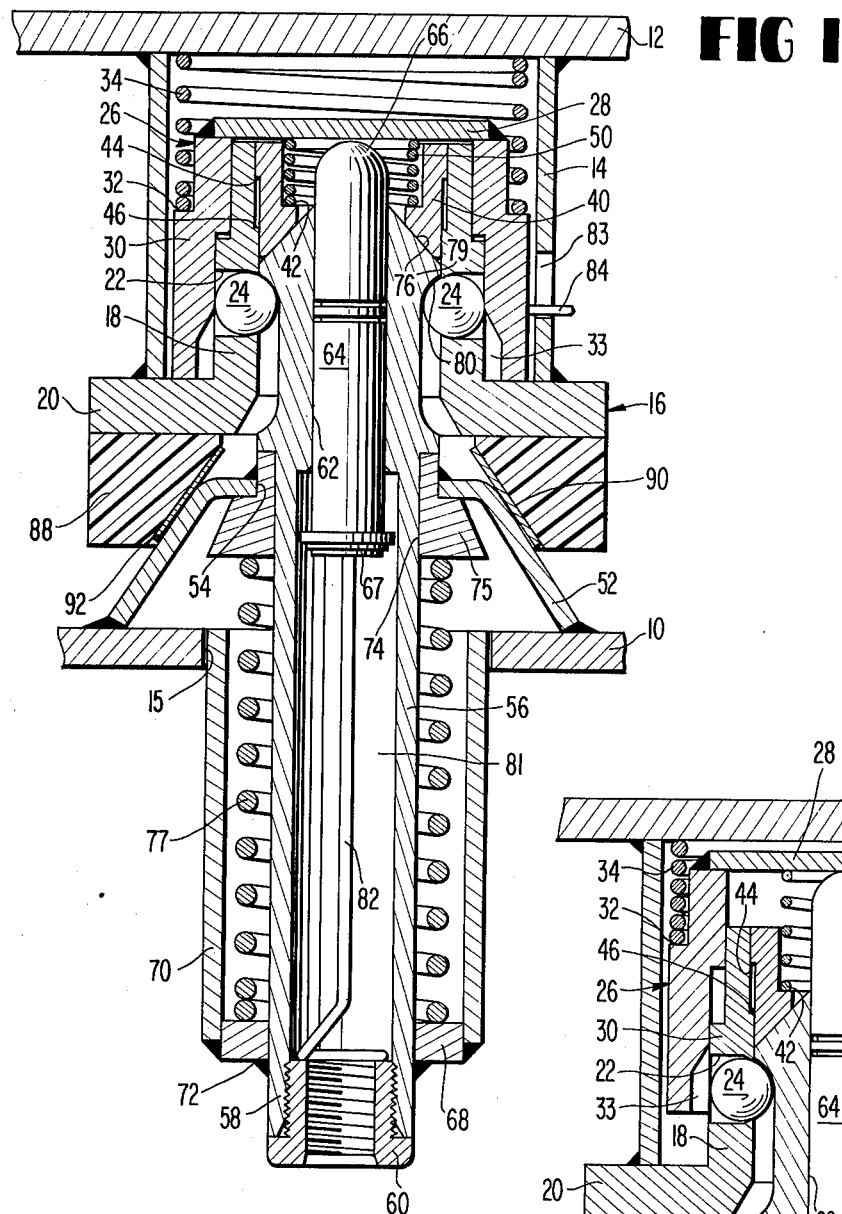
FIG. 1 is a cross-sectional view of the latching mechanisms in their latched position.

Referring now to the drawings wherein like numerals indicate like parts, the numeral 10 indicates a chassis of a truck body and the numeral 12 indicates the lower surface of a tilting cab. Securely affixed and extending downwardly from the cab 12 is a cylindrical housing 14. Secured to the cylindrical housing 14 is a hat-shaped member 16 having a cylindrical portion 18 and an outwardly extending flange 20. Circumferentially spaced about the cylindrical portion 18 are a plurality of openings 22, each of which receives a ball 24.

Disposed over the upper end of the hat-shaped member 16 is an inverted cup-shaped member 26 formed of a plate 28 and a downwardly depending skirt 30. An outwardly extending annular ledge 32 of skirt 30 is adapted to receive a spring 34 which is disposed between the flange and the lower surface of chassis 12. At the lower interior end of skirt 30 there is formed an annular chamber 33. When openings 22 are at a level corresponding to the chamber 33, the balls 24 can be moved radially outwardly into the chamber.

Disposed interiorly of the cylinder 18 is an annular keeper 40 having an interior annular ledge 42 and an exterior annular ledge 44. The ledge 44 engages a ledge 46 formed on the interior of member 18 when the keeper 40 is in its lowermost position. A spring 50 is disposed between the underside of plate 28 and the ledge 42 to bias the keeper 40 downwardly for purposes which will hereinafter be described.

Disposed below the cylinder 14, the truck bed 10 is formed with an opening 50. Welded to the bed 10 about the opening 50 is a truncated, generally cone-shaped member 52 having an upper opening 54 coaxial with the opening 50. Welded to member 52 and extending to opening 54 is a sheath 56 having a lower end 58 to which a hydraulic fitting 60 is threadably received.

Interiorly of the upper end of sheath 56 is a cylindrical chamber 62 that snugly and slidably receives a piston 64 having an upper operating end 66 and a lower end 67. At its bottom the sheath 56 has a ring member 68 welded thereto. Welded to the outer surface at 72 of the ring 68 is an upstanding cylindrical cover 70. The upper surface of ring 68 and the lower surface of a ring 75, disposed about sheath 56, provide a space for a compression spring 77. The ring 75 and the sheath 56 are fixedly secured to one another at 74. At its upper end, the sheath has a conical surface 76. Below the conical camming surface 76 is an annular groove 79 having a camming surface 80.

When the cab 12 is on chassis 10, the cap 26 is biased downwardly against the upper surface of flange 20 causing the annular chamber 33 to be below the level of openings 22. This forces the balls or detents 24 inwardly against the annular camming surface 80 and securely locks the cab 12 to the bed 10.

In order to disconnect the unit, hydraulic pressure is applied through fitting 60 causing piston 64 to press against plate 28 driving it upwardly toward cab 12. This, in turn, raises the skirt 30 and consequently the chamber 33 to a level which permits the detents 24 to move outwardly out of engagement with the surface 22. As the cab 12 moves away from the chassis member 10, the surface 80 pushes detents 24 into chamber 33.

Figure 2:
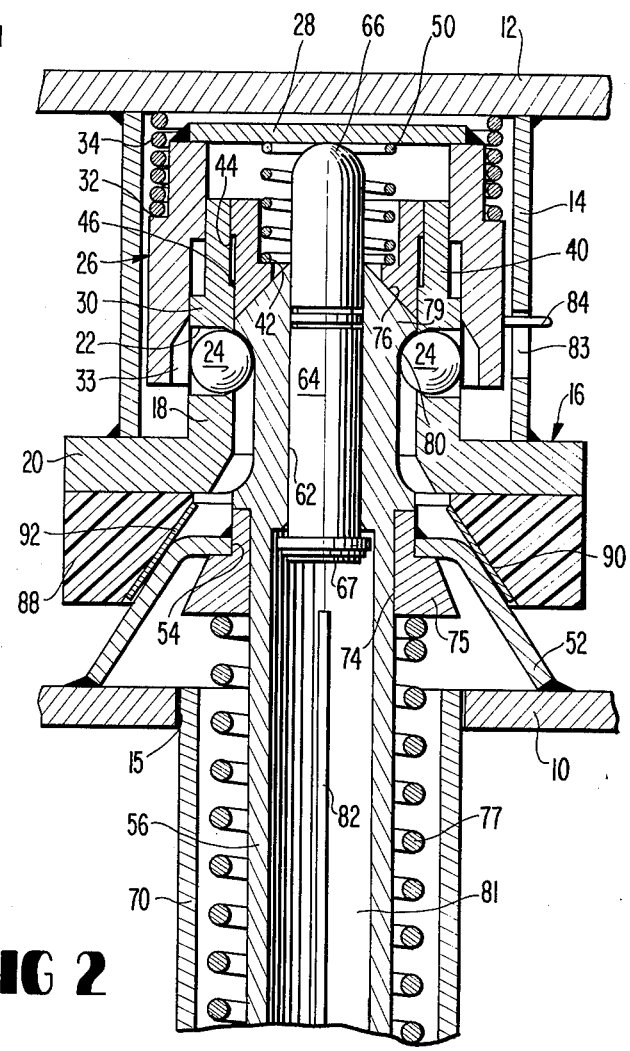
FIG. 2 is a cross-sectional view of FIG. 1 with hydraulic pressure applied so that the units can be disconnected.

When cab and chassis are not connected, the elements assume the positions shown in FIG. 2. Note that since the conical portion 76 is no longer against the keeper 46, the spring 50 causes the keeper to be biased downwardly over openings 22 to maintain the balls 24 in chamber 33. Thus, in the event that there is a loss of pressure in chamber 81 and the piston 64 falls against the supporting rod 82, the cab can still be nested in chassis 10 when the cab is lowered. In this instance, the camming surface 76 will push the keeper 40 upwardly permitting the balls 24 to move inwardly beneath the surface 80.

In the side wall of cylinder 14, a slot 87 is provided to receive a pin 84 that extends outwardly from skirt 30. The position of pin 84 will indicate whether the units are locked together in the presence or absence of hydraulic pressure. If the pin 84 is as shown in FIG. 1, it indicates that the cap 30 is down and the units are locked together. In the event the pin is against the upper end of the slot 87, it indicates the units, although nested, are unlocked.

Although the member 52 is made of a heavy gauge steel, there is some flexibility therein. The spring 70, disposed between the rings 68 and 55, acts as a shock absorber when forces are transmitted between the cab and the chassis; for instance, if the vehicle is traversing difficult terrain.

A polyurethane annular member 88 secured to the bottom surface of flange 20 and having an outwardly flared, conical opening 90 covered by a truncated, conical wear member 92. The insulator 88 reduces the undesirable effects of having metal-to-metal contact between the main locking unit 5 and also absorbs some of the shock as the units are brought together. The member 88 also cooperates to absorb some of the shock transmitted to the cab by virtue of a flexure in member 52.

Figure 3:
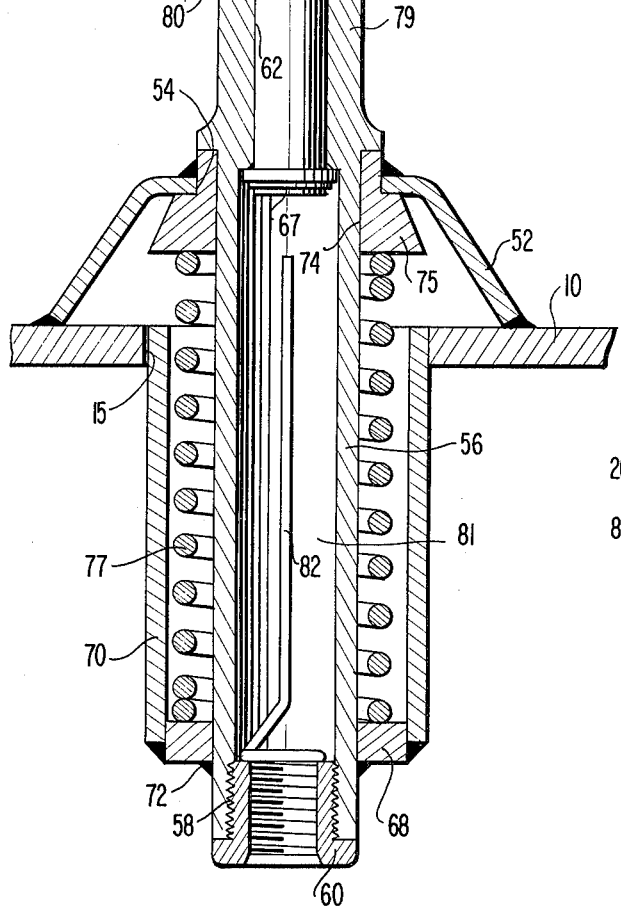
FIG. 3 is a cross-sectional view of the elements when disconnected.
Figure 4:
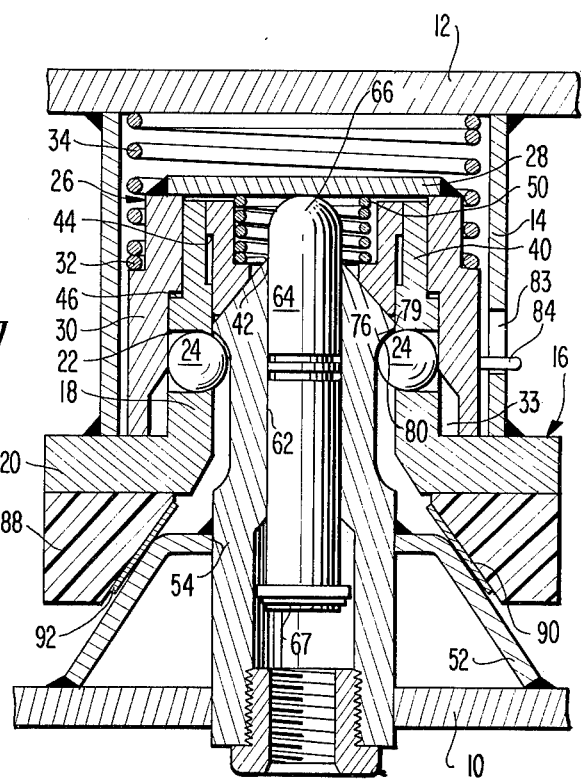
FIG. 4 is a cross-sectional view of an embodiment of the invention shown in FIGS. 1-3.

In FIG. 3 there is shown an embodiment without the shock absorber spring 77. In such an embodiment, several components can be eliminated such as those elements necessary to house spring 77.

In a general manner, while there has been disclosed an effective and efficient embodiment of the invention, it should be well understood that the invention is not limited to such an embodiment, as there might be changes made in the arrangement, disposition, and form of the parts without departing from the principle of the present invention as comprehended within the scope of the accompanying claims.

We claim:

1. A motor vehicle having an elongated chassis member, a cab member pivotally mounted to said chassis member about an axis transverse to the longitudinal axis of said chassis member for a movement from a lowered first position to a second raised position, a releasable latching mechanism comprising, a sheath having an outer end extending from one of said members toward the other of said members, a housing on the other end of said members to receive said outer end, a piston slidably received in said sheath along the longitudinal axis of said sheath, means in said housing to support a plurality of detents for radial movement, said sheath having on its outer surface a detent locking groove, second means in said housing having a first position normally moving said detents into said locking groove and a second position wherein said detents are free to move out of said locking groove, a source of hydraulic power to cause said piston to move said second means to its second position when it is desired to unlatch said members, and third means retaining said detents radially outwardly when said members are disengaged.

2. The vehicle of claim 1 wherein said second means includes a skirt about said means, said skirt having an interior groove sufficient in size to receive said detents and a source of hydraulic pressure causes said piston to engage and move said skirt to said second position wherein said groove is co-planar with said detents.

3. The vehicle of claim 1 wherein said third means is comprised of a spring-biased keeper ring in said housing.

4. The vehicle of claim 1 wherein said sheath has an upper end defining an annular shoulder and said detent locking groove is partially defined by said shoulder.

5. The motor vehicle of claim 1 wherein said means includes, a hat-shaped member having a cylindrical portion coaxial with said sheath when said members are together and an annular flange extending outwardly from the lower end thereof, said cylindrical portion having a co-planar set of openings therethrough to receive said detents, a cap member having a plate disposed over the upper end of said cylindrical portion and a cylindrical skirt extending downwardly therefrom about said cylindrical portion, said skirt having an interior groove to receive said detents when in their disengaged position and a surface causing said detents to be in their inward position when said members are engaged.

6. The vehicle of claim 4 wherein said second means includes third means comprised of a spring-biased keeper ring in said housing.

7. The vehicle of claim 5 including spring means in said housing for normally urging said keeper to a position causing said detents to move outwardly when said members are unlatched.

8. The vehicle of claim 1 and including shock absorber means for absorbing shock as said latching element enters said receiving means.

9. The vehicle of claim 5 wherein said means for absorbing shock comprises a ring of elastomeric material having downwardly and inwardly tapered wall portions defining a central opening.

10. The vehicle of claim 6 and including an annular bearing plate on said tapered wall portions, and means mounted to said latching element and said chassis for engagement with said annular plate.

11. The vehicle of claim 1 wherein a semi-rigid member supports said sheath to said chassis and a spring is located between said semi-rigid member and said chassis for permitting limited movement between said cab and said chassis as they traverse rough terrain.

* * * * *